(12) United States Patent
Simon et al.

(10) Patent No.: US 11,396,846 B2
(45) Date of Patent: Jul. 26, 2022

(54) AIRCRAFT TURBINE ENGINE MECHANICAL REDUCTION GEAR

(71) Applicants: SAFRAN AIRCRAFT ENGINES, Paris (FR); SAFRAN TRANSMISSION SYSTEMS, Colombes (FR)

(72) Inventors: Adrien Louis Simon, Saint-Denis (FR); Matthieu Bruno François Foglia, Melun (FR)

(73) Assignees: SAFRAN AIRCRAFT ENGINES, Paris (FR); SAFRAN TRANSMISSION SYSTEMS, Colombes (FR)

( * ) Notice: Subject to any disclaimer, the term of this patent is extended or adjusted under 35 U.S.C. 154(b) by 265 days.

(21) Appl. No.: 16/810,158

(22) Filed: Mar. 5, 2020

(65) Prior Publication Data

US 2020/0284203 A1 Sep. 10, 2020

(30) Foreign Application Priority Data

Mar. 7, 2019 (FR) ..................................... 1902311

(51) Int. Cl.
*F02C 7/36* (2006.01)
*F02C 7/06* (2006.01)
(Continued)

(52) U.S. Cl.
CPC .................. *F02C 7/36* (2013.01); *F02C 7/06* (2013.01); *F16H 1/36* (2013.01); *F16H 57/042* (2013.01);
(Continued)

(58) Field of Classification Search
CPC ...... F02C 7/36; F02C 7/06; F16H 1/36; F16H 57/042; F16H 57/043; F16H 57/0471; F16H 57/0486; F05D 2220/32; F05D 2260/98
See application file for complete search history.

(56) References Cited

U.S. PATENT DOCUMENTS 6,223,616 B1 * 5/2001 Sheridan ............. F16H 57/0482
74/468
10,458,279 B2 10/2019 Gedin et al.
(Continued)

FOREIGN PATENT DOCUMENTS

EP 2518279 A2 10/2012
EP 2554874 A2 2/2013
(Continued)

OTHER PUBLICATIONS

Rapport de Recherche Préliminaire/Opinion Écrite, dated Jul. 15, 2019, issued in corresponding French Application No. 1902311 filed Mar. 7, 2019, 6 pages.

*Primary Examiner* — Brian P Wolcott
*Assistant Examiner* — Joshua R Beebe
(74) *Attorney, Agent, or Firm* — Christensen O'Connor Johnson Kindness PLLC

(57) ABSTRACT

A turbine engine mechanical reduction gear, for example, of an aircraft, the reduction gear comprising: a sun gear having an axis of rotation; a ring gear which extends around the sun gear and which is configured to be immobile in rotation about the axis; planetary gears which are meshed with the sun gear and the ring gear and which are supported by a planetary carrier which is configured to be mobile in rotation about the axis; at least one lubrication oil distributor which comprises a stator portion immobile in rotation and a rotating integral rotor portion of the planetary carrier; and an (Continued)

annular oil deflector which is integral with the ring gear, wherein the stator portion of the distributor is integral with the deflector.

12 Claims, 6 Drawing Sheets

(51) Int. Cl.
  *F16H 1/36* (2006.01)
  *F16H 57/04* (2010.01)

(52) U.S. Cl.
  CPC ....... *F16H 57/043* (2013.01); *F16H 57/0471* (2013.01); *F16H 57/0486* (2013.01); *F05D 2220/32* (2013.01); *F05D 2260/98* (2013.01); *F16H 57/0456* (2013.01)

(56) References Cited

U.S. PATENT DOCUMENTS

| | | | |
|---|---|---|---|
| 2009/0090096 A1* | 4/2009 | Sheridan | F02C 7/36 60/226.3 |
| 2011/0299974 A1 | 12/2011 | Gauthier et al. | |
| 2013/0004297 A1* | 1/2013 | Sheridan | F02K 3/04 415/122.1 |
| 2013/0225353 A1* | 8/2013 | Gallet | F16H 57/0423 475/159 |
| 2016/0032770 A1* | 2/2016 | Sheridan | B01D 19/0068 60/39.08 |
| 2016/0215871 A1* | 7/2016 | Brault | F16H 57/0479 |

FOREIGN PATENT DOCUMENTS

| | | | |
|---|---|---|---|
| FR | 3041054 A1 | 3/2017 | |
| WO | 2010/092263 A1 | 8/2010 | |
| WO | WO-2015026899 A1 * | 2/2015 | ........... F01D 25/243 |

* cited by examiner

[Fig. 1]
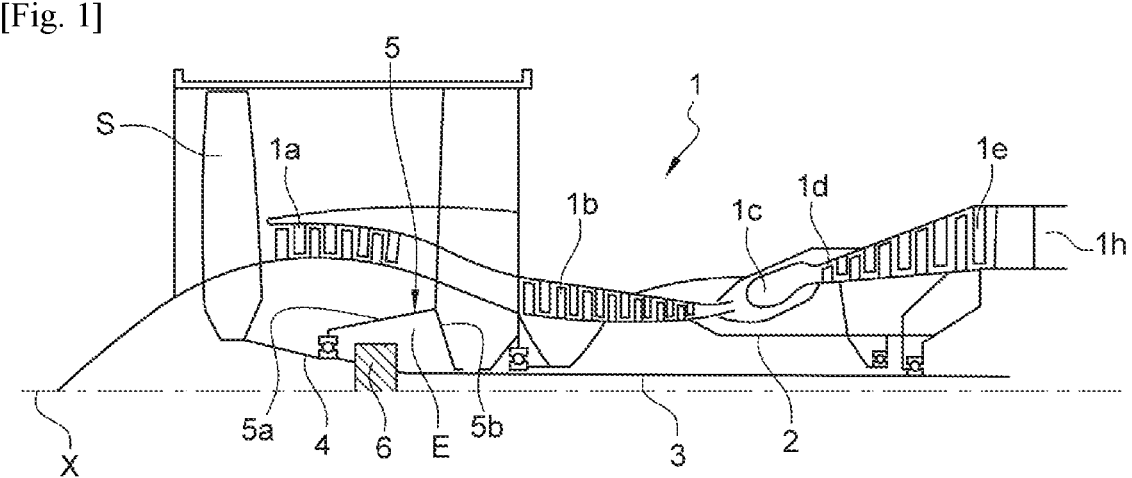

[Fig. 2]
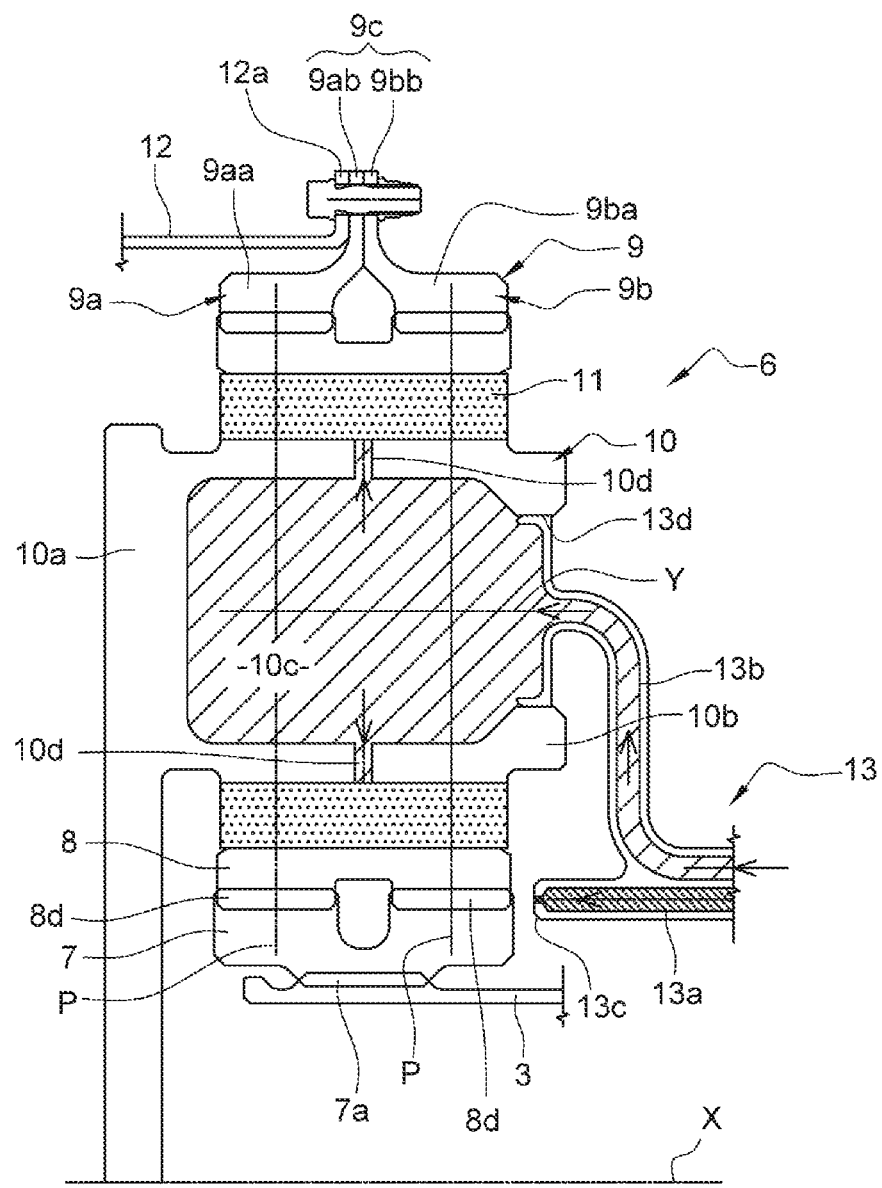

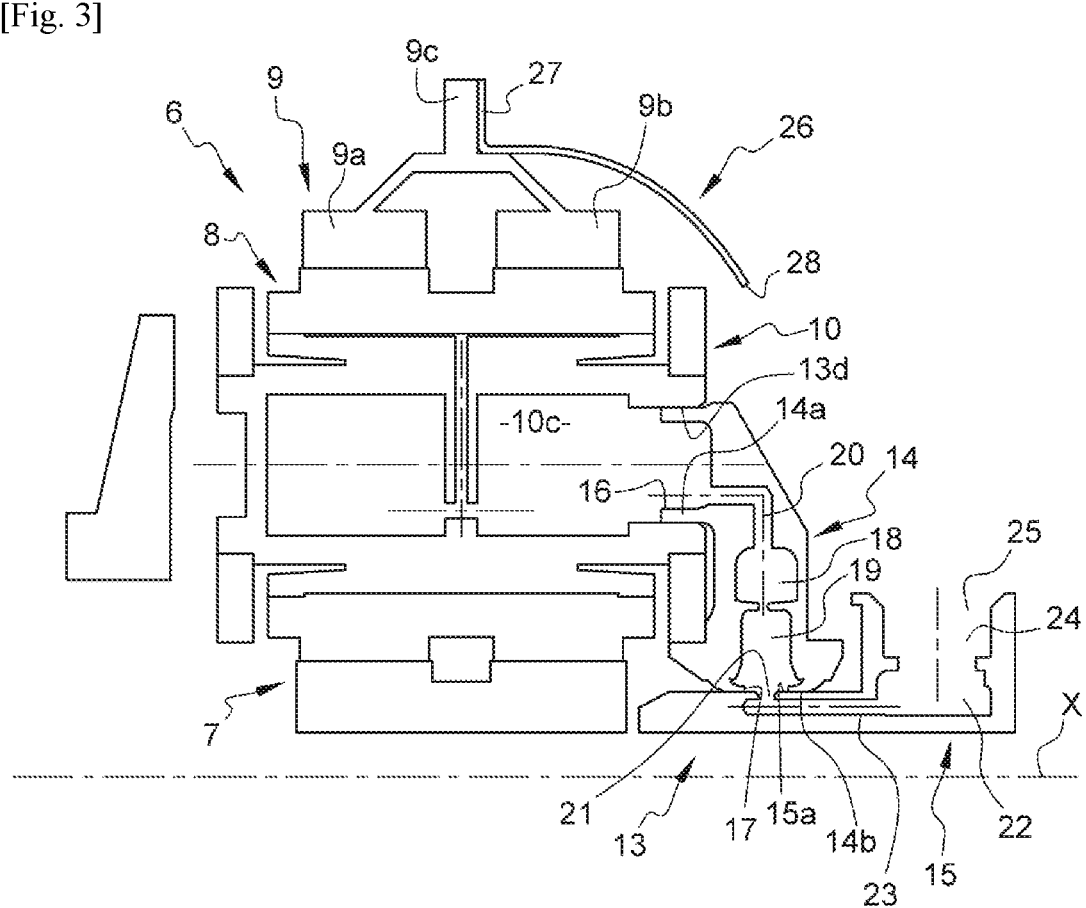
[Fig. 3]

[Fig. 4]
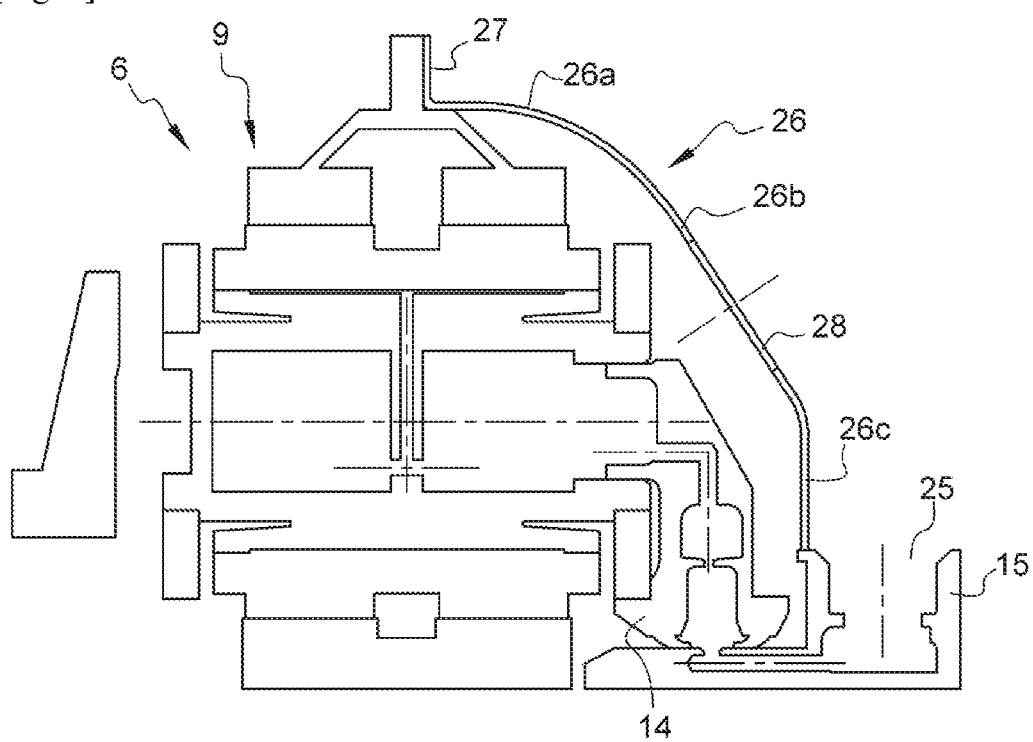

[Fig. 5]
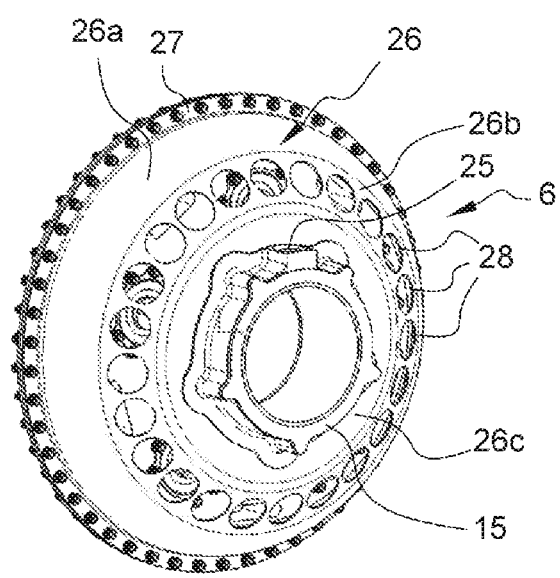

[Fig. 6]
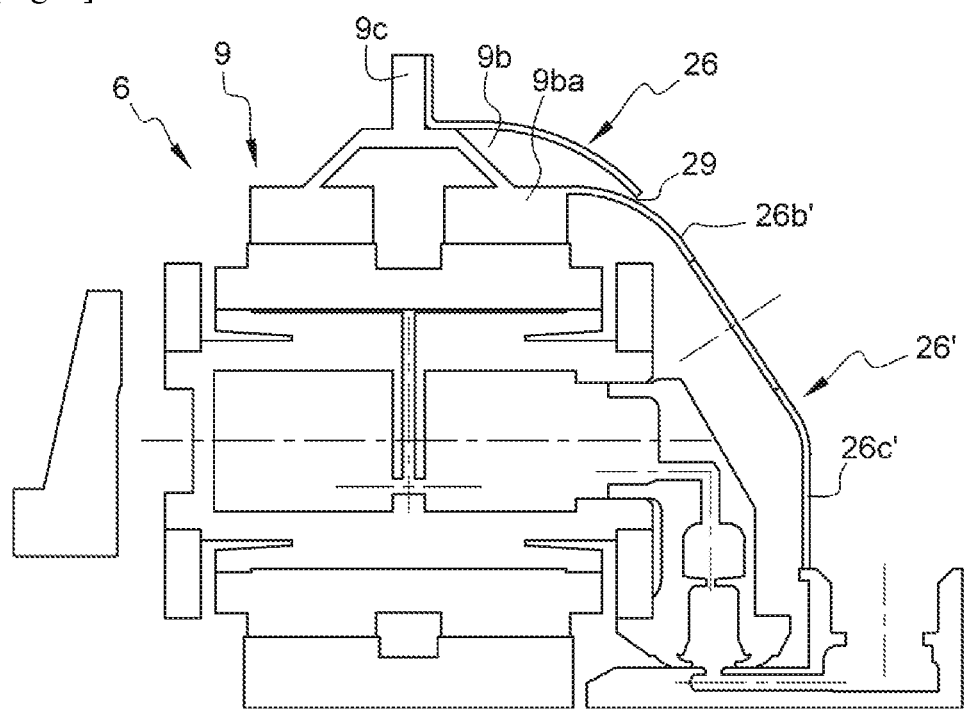

AIRCRAFT TURBINE ENGINE MECHANICAL REDUCTION GEAR

TECHNICAL FIELD

Embodiments of the present disclosure relate to the field of mechanical reduction gears for turbine engines, in particular of aircraft.

BACKGROUND

The state of the art comprises, in particular, documents WO-A1-2010/092263, FR-A1-2 987 416, FR-A1-3 041 054, EP-A2-2 518 279 and EP-A2-2 554 874.

The role of a mechanical reduction gear is to modify the speed and torque ratio between the input axis and the output axis of a mechanical system.

New generations of bypass turbine engines, in particular those having a high dilution rate, comprise a mechanical reduction gear for driving the shaft of a fan. Usually, the reduction gear aims to transform the rotation speed, referred to as rapid rotation speed, of the shaft of a power turbine into a slower rotation speed for the shaft driving the fan.

Such a reduction gear comprises a central pinion, referred to as a sun gear, a ring gear and pinions referred to as planetary gears, which are in contact between the sun gear and the ring gear. The planetary gears are supported by a chassis, referred to as a planetary carrier. The sun gear, the ring gear and the planetary carrier are planetary, as the axes of revolution thereof coincide with the longitudinal axis X of the turbine engine. The planetary gears each have a different axis of revolution, evenly distributed over the same operating diameter about the planetary axis. These axes are parallel with the longitudinal axis X.

There are several reduction gear architectures. In the state of the art of bypass turbine engines, the reduction gears are of the planetary or epicyclic type. There are, in other similar applications, so-called differential or "compound" architectures.

In a planetary reduction gear, the planetary carrier is fixed and the ring gear constitutes the output shaft of the device which rotates in the reverse direction to the sun gear.

In an epicyclic reduction gear, the ring gear is fixed and the planetary carrier constitutes the output shaft of the device which rotates in the same direction as the sun gear.

In a differential reduction gear, no element is fixed in rotation. The ring gear rotates in the opposite direction to that of the sun gear and the planetary carrier.

Reduction gears can comprise one or more meshing stages. This meshing is ensured in different manners, for example by contact, by friction or also by magnetic field. There are several types of meshing by contact, like with spur gearing or chevron gearing.

A reduction gear must be lubricated and the input of lubrication oil to the rotating components of a reduction gear can be problematic. The oil is brought to the reduction gear by a distributor which comprises a rotating immobile stator portion and a rotating integral rotor portion of the planetary carrier when the reduction gear is of the epicyclic type. The stator portion of the distributor engages with the sealing with the rotor portion, this sealing needing to be guaranteed while the stator portion must, when operating, be moved and tilt with respect to the reduction gear and follow the movements of the rotor portion. In the current art, the stator portion is immobilised in rotation by rod connection to a stator casing of the turbine engine.

The present disclosure proposes a simple, effective and economic improvement to this technology or others.

SUMMARY

Embodiments of the present disclosure relate to a planetary carrier for a turbine engine mechanical reduction gear, for example for an aircraft. In an embodiment, the reduction gear comprises:
- a sun gear having an axis of rotation;
- a ring gear which extends around the sun gear and which is configured to be immobile in rotation about the axis;
- planetary gears which are meshed with the sun gear and the ring gear and which are maintained by a planetary carrier which is configured to be mobile in rotation about the axis;
- a lubrication oil distributor which comprises a stator portion immobile in rotation and a rotating integral rotor portion of the planetary carrier; and
- at least one annular oil deflector which is integral with the ring gear, wherein the stator portion of the distributor is integral with the deflector.

In the state of the art, the deflector has a single function for capturing and guiding the oil projected radially outwards, in view of the evacuation thereof and the recycling thereof. In the present disclosure, the deflector has this function and furthermore, has another function of supporting the stator portion of the distributor in order to limit the relative movements and the relative tilting between the stator and rotor portions of the operating distributor, which makes it possible to guarantee good sealing between these portions, for example.

The solution proposed below is compatible with an epicyclic reduction gear, of which the ring gear is fixed in the reference from of the engine. It is compatible with any type of gearing (spur, chevron), of any type of planetary carrier, whether it is one-piece or cage carrier/cage type, and it is compatible with planetary gear bearings composed of rolling elements (ball bearings, roller bearings, conical roller bearings, etc.) or with hydrodynamic bearings.

A reduction gear according to the disclosure can comprise one or more of the following features, taken individually from one another, or combined with one another:
- the deflector comprises an annular flange for mounting to an annular flange of the ring gear,
- the ring gear comprises two half-ring gears each comprising a rim equipped with a gearing and a mounting half-flange, the mounting half-flanges being fixed together and to the flange of the deflector,
- the ring gear comprises two half-ring gears each comprising a rim equipped with a gearing and a mounting half-flange, the ferrule being fixed to the rim of one of the half-ring gears or being formed as a single part with one of the half-ring gears,
- the deflector comprises an outer peripheral portion extending around a half-ring gear,
- the deflector comprises an inner peripheral portion extending generally radially to the axis,
- the deflector can comprise an annular row of through holes,
- the deflector comprises a truncated portion, where the spaces are formed,
- the stator portion of the distributor comprises:
- an outer cylindrical surface comprising oil outlet orifices and configured to engage in a sealing manner with the rotor portion of the distributor, and an inner oil circuit comprising an annular cavity connected, on the one hand, to lines extending generally axially and connecting the cavity to the orifices, and on the other hand, to at least one supply channel extending generally radially from the cavity.

The disclosure furthermore relates to a turbine engine, for example of an aircraft, comprising an embodiment of the mechanical reduction gear, such as those described above.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 1 is a schematic, cross-sectional, axial view of a turbine engine according to an embodiment of the present disclosure;

FIG. 2 is a partial, cross-sectional, axial view of a mechanical reduction gear according to an embodiment of the present disclosure;

FIG. 3 is another partial, cross-sectional, axial view of a mechanical reduction gear according to an embodiment of the present disclosure in comparison to the prior art;

FIG. 4 is another partial, cross-sectional, axial view of a mechanical reduction gear according to an embodiment of the present disclosure;

FIG. 5 is a perspective view of the reduction gear of FIG. 4; and

FIG. 6 is a view similar to that of FIG. 4 and illustrating another embodiment of the disclosure.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

FIG. 1 describes a turbine engine 1 which comprises a fan S, a low-pressure compressor 1a, a high-pressure compressor 1b, an annular combustion chamber 1c, a high-pressure turbine 1d, a low-pressure turbine 1e and an exhaust pipe 1h. The high-pressure compressor 1b and the high-pressure turbine 1d are connected by a high-pressure shaft 2 and form with it a high-pressure (HP) body. The low-pressure compressor 1a and the low-pressure turbine 1e are connected by a low-pressure shaft 3 and form with it a low-pressure (LP) body.

The fan S is driven by a fan shaft 4 which is connected to the LP shaft 3 by a reduction gear 6. This reduction gear 6 can be, for example, of the planetary or epicyclic type.

The following description relates to a reduction gear of the epicyclic type, in which the planetary carrier and the sun gear are mobile in rotation, the ring gear of the reduction gear being fixed in the engine frame of reference.

The reduction gear 6 is positioned in the front portion of the turbine engine. In the present application, the expressions "upstream" and "downstream" make reference to the general flow of gases in the turbine engine, along the axis of extension thereof or axis of rotation of the rotors thereof. A fixed structure schematically comprising, here, an upstream portion 5a and a downstream portion 5b which forms the engine casing or stator 5 is arranged so as to form an enclosure E surrounding the reduction gear 6. This enclosure E is here closed upstream by seals at the level of a bearing making it possible for the passage of the fan shaft 4, and downstream by seals at the level of the passage of the LP shaft 3.

FIG. 2 shows an epicyclic reduction gear 6. At the inlet, the reduction gear 6 is connected to the LP shaft 3, for example by way of inner splines 7a. Thus, the LP shaft 3 drives a planetary pinion termed the sun gear 7. The sun gear 7, of which the axis of rotation is combined with that of the turbine engine X, drives a series of pinions termed planetary gears 8, which are evenly distributed over the same diameter about the axis of rotation X. This diameter is equal to double the operating distance between the sun gear 7 and the planetary gears 8. The number of planetary gears 8 is generally defined between three and seven for this type of application.

All of the planetary gears 8 are supported by a chassis, referred to as a planetary carrier 10. Each planetary gear 8 rotates about its own axis Y, and meshes with the ring gear 9.

At the outlet, the following occurs:

In this epicyclic configuration, all of the planetary gears 8 drive the planetary carrier 10 in rotation about the axis X of the turbine engine. The ring gear is fixed to the engine casing or stator 5 via a ring gear carrier 12 and the planetary carrier 10 is fixed to the fan shaft 4.

In another planetary configuration, all of the planetary gears 8 are maintained by a planetary carrier 10 which is fixed to the engine casing or stator 5. Each planetary gear drives the ring gear, which is connected to the fan shaft 4 via a ring gear carrier 12.

Each planetary gear 8 is mounted free for rotation using a bearing 11, for example of roller or hydrodynamic bearing type. Each bearing 11 is mounted on one of the axes 10a of the planetary carrier 10 and all the axes are positioned against one another using one or more structural chassis 10a of the planetary carrier 10. There is a number of axes 10b and bearings 11 equal to the number of planetary gears. For operating, mounting, production, control, repair or replacement reasons, the axes 10b and the chassis 10a can be separated into several parts.

For the same reasons cited above, the gearing of a reduction gear can be separated into several helices, each having a median plane P. In this example, the operation of a reduction gear with several helices with a ring gear separated into two half-ring gears is detailed:

A front half-ring gear 9a composed of a rim 9aa and of a mounting half-flange 9ab. On the rim 9aa, the front helix of the gearing of the reduction gear is located. This upstream helix meshes with that of the planetary gear 8 which meshes with that of the sun gear 7.

A downstream half-ring gear 9b consisting of a rim 9ba and of a mounting half-flange 9bb. On the rim 9ba the downstream helix of the gearing of the reduction gear is located. This downstream helix meshes with that of the planetary gear 8 which meshes with that of the sun gear 7.

If the helices widths vary between the sun gear 7, the planetary gears 8 and the ring gear 9 due to overlapping gearing, they are all centred on a median plane P for the upstream helices and on another median plane P for the downstream helices. In the case of a roller bearing with two rows of rollers, each row of rolling elements is also preferably, but not necessarily centred on two median planes.

The mounting half-flange 9ab of the upstream ring gear 9a and the mounting half-flange 9bb of the downstream ring gear 9b form the mounting flange 9c of the ring gear. The ring gear 9 is fixed to the ring gear carrier by assembling the mounting flange 9c of the ring gear and the mounting flange 12a of the ring gear carrier using a bolted mounting, for example.

The arrows of FIG. 2 describe the progression of the oil in the reduction gear 6. The oil arrives in the reduction gear 6 from the stator portion 5 in the distributor 13 by different means which will not be specified in this view, as they are specific to one or more types of architecture. The distributor 13 comprises injectors 13a and arms 13b. The injectors 13a have the function of lubricating the gearings, and the arms 13b have the function of lubricating the bearings. Oil is brought towards the injector 13a to emerge through the end 13c in order to lubricate the gearings. Oil is also brought towards the arm 13b and circulates via the inlet duct 13d of the bearing. Oil then circulates through the axis in one or more buffer zones 10c to then emerge through the orifices 10d in order to lubricate the bearings of the planetary gears.

FIG. 3 represents a more concrete example embodiment of an oil distributor 13 which comprises a rotor portion 14 and a stator portion 15.

The rotor portion 14 is integral in rotation with the planetary carrier 10 and has a general annular shape about the axis X. This portion 14 comprises nozzles 14a engaged in the inlet ducts 13d of the bearings 11 of the planetary gears 8 and comprising oil outlet orifices 16 for supplying oil from the buffer zones 10c.

The rotor portion 14 comprises, at the inner periphery thereof, an inner cylindrical surface 14b comprising oil inlet orifices 17. The rotor portion 14 further comprises an annular chamber 18 which is connected, on the one hand, by first channels 19 substantially radial to the orifices 17, and by substantially L-shaped second channels 20 to the orifices 16.

The stator portion 15 of the distributor 13 is integral with a casing of the turbine engine which is not represented. In practice, the portion 15 is connected to the casing by an arm which is used to avoid the angular deviation of the reduction gear 6.

The stator portion 15 has a general annular shape about the axis X and comprises a cylindrical body engaged in the rotor portion 14 and comprising an outer cylindrical surface 15a comprising oil outlet orifices 21. The surfaces 14b and 15a engage together when operating to guarantee sealing between the inner oil circuits of the distributor 13. The inner oil circuit of the stator portion 15 comprises an annular cavity 22 connected, on the one hand, to lines 23 extending substantially axially and connecting the cavity 22 to the orifices 21, and on the other hand, to at least one supply channel 24 extending substantially radially from the cavity 22. The channel 24 opens radially outwards over an outer surface of the stator portion 15 to form an oil inlet orifice 25. The reduction gear 6 of FIG. 3 further comprises an annular oil deflector 26.

This deflector 26 is integral with the ring gear 9 and forms part of the stator of the reduction gear, as the ring gear 9 is fixed. The deflector 26 is presented in the form of a thin annular ferrule. The deflector 26 comprises a radially outer peripheral edge which is fixed to the ring gear 9 and which comprises, in particular, an annular flange 27 for mounting to the flange 9c of the ring gear. The deflector 26 extends around a half-ring gear 9b, here downstream, and comprises a radially inner peripheral edge which is free.

In the axial cross-section, the deflector 26 has a generally curved shape. It is configured to capture the oil, centrifugated and expelled radially outwards in operation, and to route this oil to the flange 9c of the ring gear 9, where this oil can be evacuated and recycled.

However, as mentioned above, to guarantee the sealing between the rotor 14 and stator 15 portions of the distributor 13, any relative movement must be limited, even prevented (outside of the rotation of the rotor portion 14 around the stator portion 15) and any relative tilting of these portions.

The disclosure makes it possible to overcome this problem and proposes embodiment shown in, for example, FIGS. 4 and 5, in which the deflector 26 is modified to give it an additional function for supporting the stator portion 15 of the deflector 26. The maintenance of the stator portion 15 by a stator element of the reduction gear, in this case the ring gear 9, makes it possible to limit, or even prevent, the abovementioned relative movements and tilting.

For this, the deflector 26 is extended and now extends from the ring gear 9 to the stator portion 15. The deflector 26 comprises a radially outer peripheral portion 26a similar to that of FIG. 3 (and comprises a flange 27 for mounting to the ring gear 9), and in addition comprises two additional portions, namely a radially inner peripheral portion 26c and an intermediate portion 26b (situated between the portions 26a, 26c).

The intermediate portion 26a has a general truncated shape and comprises, in the example represented, an annular row of through holes 28 being used to adapt the mass and the flexibility of the part 26. These holes are not necessary for the correct operation of the part 26.

The inner portion 26c extends substantially radially with respect to the axis X and can be fixed to the stator portion 15 by any suitable means, for example, by welding or interference fitting. In a variant, the deflector 26 could be formed as a single part with the stator portion 15.

In the example represented, where the stator portion 15 is engaged in the rotor portion 14 from downstream and the inlet orifice 25 thereof is situated downstream of the reduction gear 6, the connection of the deflector 26 to this stator portion 15 can be situated just upstream of this orifice 25.

In the embodiment of FIG. 6, a deflector 26, such as prior art deflector in some embodiments, is provided and an additional deflector 26' equips the reduction gear 6.

The deflector 26' comprises portions 26b', 26c' similar to those of the deflector 26 of FIGS. 4 and 5. The peripheral edge of the deflector 26' here is not fixed to the flange of the ring gear, but is connected directly to a rim 9ba of one of the half-ring gears, here downstream 9b. The deflector 26' can be fixed to the rim 9ba by welding or can be formed as a single part with this rim, as in the example represented.

The inner peripheral free edge of the deflector 26 surrounds the outer periphery of the deflector 26' and is spaced from the deflector 26' by a low radial clearance 29.

Thus, the solution proposed by the disclosure consists of integrating two functions in one same part which makes the design of the architecture simpler. Furthermore, the deflector is a more effective technique or methodology than the abovementioned arm of the state of the art to avoid the angular deviation of the reduction gear.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A turbine engine mechanical reduction gear for an aircraft, the reduction gear comprising:
   a sun gear having an axis of rotation;
   a ring gear which extends around the sun gear and which is configured to be immobile in rotation about said axis;
   planetary gears which are meshed with the sun gear and the ring gear and which are supported by a planetary carrier which is configured to be mobile in rotation about said axis;
   a lubrication oil distributor which comprises a stator portion immobile in rotation and a rotating integral rotor portion of said planetary carrier; and
   at least one annular oil deflector which is integral with the ring gear,
   wherein said stator portion of the distributor is integral with said deflector.

2. The mechanical reduction gear according to claim 1, wherein the deflector comprises an annular flange for mounting to an annular flange of the ring gear.

3. The mechanical reduction gear according to claim 2, wherein the ring gear comprises two half-ring gears each comprising a rim equipped with a gearing and a mounting half-flange, the mounting half-flanges being fixed together and to the flange of the deflector.

4. The mechanical reduction gear according to claim 3, wherein the deflector comprises an outer peripheral portion extending around a half-ring gear.

5. The mechanical reduction gear according to claim 1, wherein the ring gear comprises two half-ring gears each comprising a rim equipped with a gearing and a mounting half-flange, the deflector being fixed to the rim of one of the half-ring gears or being formed as a single part with one of the half-ring gears.

6. The mechanical reduction gear according to claim 1, wherein the deflector comprises an inner peripheral portion extending generally radially to said axis.

7. The mechanical reduction gear according to claim 1, wherein the deflector comprises an annular row of through holes.

8. The mechanical reduction gear according to claim 7, wherein the deflector comprises a truncated portion wherein said holes are formed.

9. The mechanical reduction gear according to claim 1, wherein said stator portion of the distributor comprises:
   an outer cylindrical surface comprising oil outlet orifices and configured to engage in a sealing manner with said rotor portion of the distributor; and
   an inner oil circuit comprising an annular cavity connected, on the one hand, to lines extending generally axially and connecting said cavity to said orifices, and on the other hand, to at least one supply channel extending generally radially from said cavity.

10. A turbine engine for an aircraft, comprising the mechanical reduction gear according to claim 1.

11. The mechanical reduction gear according to claim 1, wherein the deflector is presented in the form of a thin annular ferrule comprising a radially outer peripheral edge which is fixed to the ring gear.

12. The mechanical reduction gear according to claim 1, wherein the deflector extends from the ring gear to the stator portion.

* * * * *